United States Patent [19]
Shimano et al.

[11] Patent Number: 5,791,831
[45] Date of Patent: *Aug. 11, 1998

[54] CUTTING INSERT

[75] Inventors: Takamasa Shimano; Tatsuo Arai; Takayoshi Saito, all of Yuuki-gun, Japan

[73] Assignee: Mitsubishi Materials Corporation, Tokyo, Japan

[*] Notice: The term of this patent shall not extend beyond the expiration date of Pat. No. 5,443,335.

[21] Appl. No.: 711,707

[22] Filed: Aug. 30, 1996

Related U.S. Application Data

[63] Continuation of Ser. No. 184,152, Jan. 21, 1994, abandoned.

[30] Foreign Application Priority Data

Jan. 21, 1993 [JP] Japan .................. 5-008653

[51] Int. Cl.$^6$ ........................ B23C 5/20
[52] U.S. Cl. ........................ 407/113; 407/42
[58] Field of Search .................. 407/42, 61, 113, 407/114, 116

[56] References Cited

U.S. PATENT DOCUMENTS

| | | | |
|---|---|---|---|
| 5,017,055 | 5/1991 | Tsujimura et al. | 407/113 |
| 5,244,318 | 9/1993 | Arai et al. | 407/113 |
| 5,443,335 | 8/1995 | Shimano et al. | 417/42 |

FOREIGN PATENT DOCUMENTS 3618574  12/1986  Germany ................ 407/114

*Primary Examiner*—Steven C. Bishop
*Attorney, Agent, or Firm*—Armstrong, Westerman, Hattori, McLeland & Naughton

[57] ABSTRACT

A cutting insert having a generally polygonal tabular form, includes a main cutting edge formed along at least one of the ridges or edges of the upper and lower surfaces which oppose each other in the direction of the thickness of the tabular form, and a face connected to the main cutting edge is formed on the flank or flanks which surround and define the upper and lower surfaces. The face includes a convex curved surface and an angle of intersection between the convex curved surface and one of the upper and lower surfaces progressively changes. The angle of intersection between the convex curved surface and one of the upper and lower surfaces progressively increases or decreases along the length of the face from the face end adjacent to a free end of the tool to a face end adjacent to the base end of the tool. In a preferred embodiment, a flat surface is disposed on each side of the convex curved surface and each flat surface intersects one of the upper and lower surfaces at a constant angle. The flat surface adjacent to the face end adjacent to the free end of the tool intersects with one of the upper and lower surfaces at an angle which is greater or smaller than the angle of intersection between the flat surface adjacent to the face end adjacent to the base end of the tool and one of the upper and lower surfaces of the cutting insert.

6 Claims, 6 Drawing Sheets

CUTTING INSERT

This application is a continuation of application Ser. No. 08/184,152 filed Jan. 21, 1994, now abandoned.

BACKGROUND OF THE INVENTION

The present invention relates to a cutting insert for use on a cutting tool such as a face milling cutter or other types of cutters.

An example of a conventionally used cutting insert is disclosed in Japanese Patent Laid-Open No. 4-63613. In that cutting insert, flanks which comprise side faces of the insert and are connected to a main cutting edge are multi-stepped so that these flanks intersect at different angles either one of the upper and lower faces connected to the main cutting edge.

This known cutting insert can provide desired degrees of cutting effect and edge strength along the main cutting edge, because the cutting insert can be designed to accommodate a desired radial rake angle of the main cutting edge at the end adjacent to the free end of the tool body and the end adjacent to the base end of the tool body.

This known cutting insert, however, suffers from the following problems due to the fact that each flank serving as a face is multi-stepped, i.e., composed of a plurality of planes. Namely, since adjacent planes are not continuous, a ridge is formed along the line at which the adjacent planes intersect each other. This ridge tends to be worn down quickly due to interference with the chips of metal cut from the work. Furthermore, a large friction resistance is produced because all of the planes of each flank contact the cut metal chips.

Accordingly, an object of the present invention is to provide a cutting insert which is adapted to be detachably attached to the body of a tool such as a face milling cutter and which is improved so as to prevent any extraordinary wear of the faces and to improve disposal of cut metal chips, while ensuring required cutting effect and edge strength along the cutting edge, thereby achieving higher cutting performance.

BRIEF SUMMARY OF THE INVENTION

According to the present invention, there is provided a cutting insert 20 basically having a diamond-shaped flat tabular form, with an upper surface 22 and a lower surface 24 opposed to each other in the direction of the thickness of the tabular form, wherein two ridges or edges which are on one breadthwise end of the cutting insert amount the four ridges or edges surrounding the upper surface 22 provide main cutting edges 26, 26, while two ridges or edges which are on the other breadthwise end of the cutting insert among the four ridges or edges surrounding the lower surface 24 provide main cutting edges 28, 28 and wherein four flanks around the upper and lower surfaces 22, 24 present faces 30 connected to the main cutting edges 26 and faces 32 connected to the main cutting edges 28, characterized in that each of the faces 30 and 32 connected to the main cutting edges 26, 28 presents an outwardly convex curved surface, the radius of curvature of the curved surface being so set that the positive angle progressively decreases along the length of the cutting insert from the cutting insert end (acute angle corner) adjacent to the free end of the tool body mounting the cutting insert towards the cutting insert base end adjacent to the base end of the tool body, and is finally reduced to zero at the cutting insert base end. Practically, the positive angle is set to range between 10° and 20° (nose angle 70° to 80°) at the cutting insert cutting end and is gradually reduced such that the positive angle is zero (nose angle 90°) at the cutting insert base end.

The cutting insert of the present invention has a generally polygonal tabular form, wherein a main cutting edge is formed along at least one of the ridges or edges of the upper and lower surfaces which oppose each other in the direction of the thickness of the tabular form, and a face connected to the main cutting edge is formed on the flank or flanks which surround and define the above-mentioned upper and lower surfaces, and wherein the above-mentioned face includes a convex curved surface which progressively changes the angle of intersection between itself and one of the upper and lower surfaces.

In a preferred form of the invention, the face includes a convex curved surface which progressively changes the angle of intersection between itself and one of the upper and lower surfaces, and a flat surface disposed on each side of the convex curved surface, each flat surface intersecting one of the upper and lower surfaces at a constant angle.

In a specific form of the invention, the convex curved surface is so determined that the angle of intersection between itself and one of the upper and lower surfaces progressively increases or decreases along the length of the face from the face end adjacent to the free end of the tool to face end adjacent to the base end of the tool.

When the face has a flat surface on each side of the convex curved surface, the flat surface adjacent to the face end adjacent to the free end of the tool intersects with one of the upper and lower surfaces at an angle which is greater or smaller than the angle of intersection between the flat surface adjacent to the face end adjacent to the tool base end and one of the upper and lower surfaces of the cutting insert.

The present invention having the described features makes it possible to vary the rake angle and the ose angle along the length of the cutting insert, i.e., from the cutting insert end adjacent to the free end of the tool towards the cutting insert end adjacent to the tool base end, thus enabling the cutting insert to meet requirements such as the cutting effect, metal-chip discharge performance and cutting edge strength, according to the conditions under which the cutting operation is to be done. By providing the face with flat surfaces formed at both sides of the convex curved surface, it is possible to obtain constant rake angle and nose angle at the portion of the face where each such flat surface is formed. When the cutting insert of the invention is designed such that the rake angle progressively decreases from the free end towards the base end, the cutting effect is enhanced at the cutting insert end adjacent to the free end of the tool while the cutting edge strength is increased at the cutting insert end adjacent to the base end of the tool. Conversely, when the cutting insert of the invention is designed such that the rake angle progressively decreases from the free end towards the base end, the cutting edge strength is increased at the cutting insert end adjacent to the free end of the tool while the cutting effect is enhanced at the cutting insert end adjacent to the base end of the tool.

3

Figure 1:
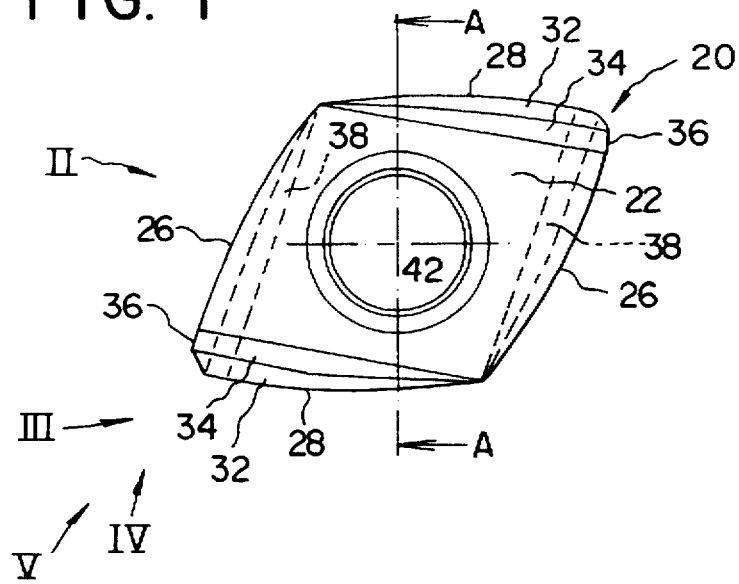
FIG. 1 is a plan view of an embodiment of the cutting insert in accordance with the present invention.
Figure 2:
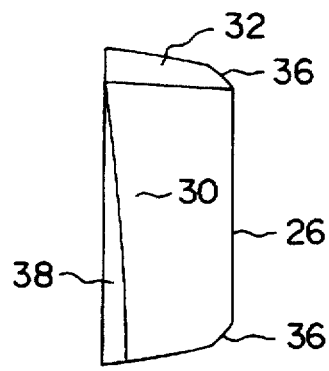
FIG. 2 is a side elevational view of the cutting insert shown in FIG. 1, as viewed in the direction indicated by an arrow II tangent to the end of the cutting edge in FIG. 1.
Figure 3:
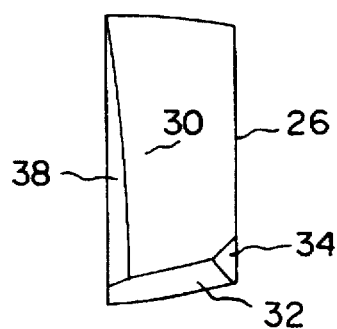
FIG. 3 is a side elevational view of the cutting insert shown in FIG. 1 as viewed in the direction indicated by an arrow III tangent to the base end of the cutting edge in FIG. 1.
Figure 4:
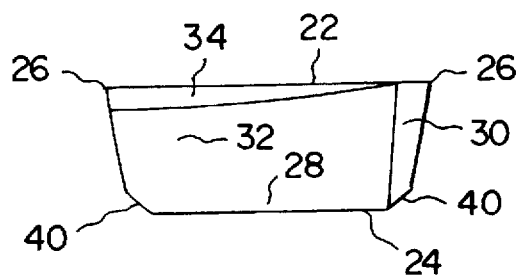
Figure 5:
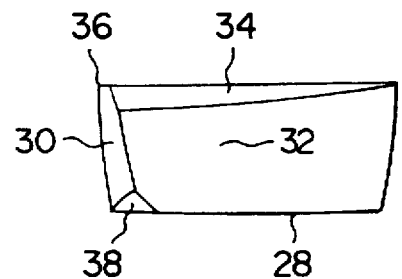
Figure 6:
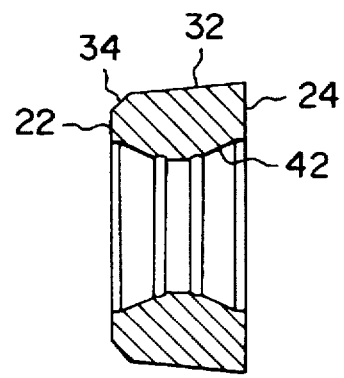
Figure 7:
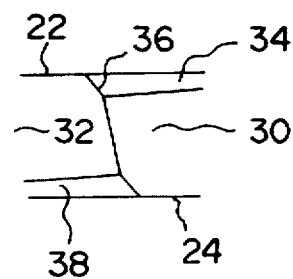
Figure 8:
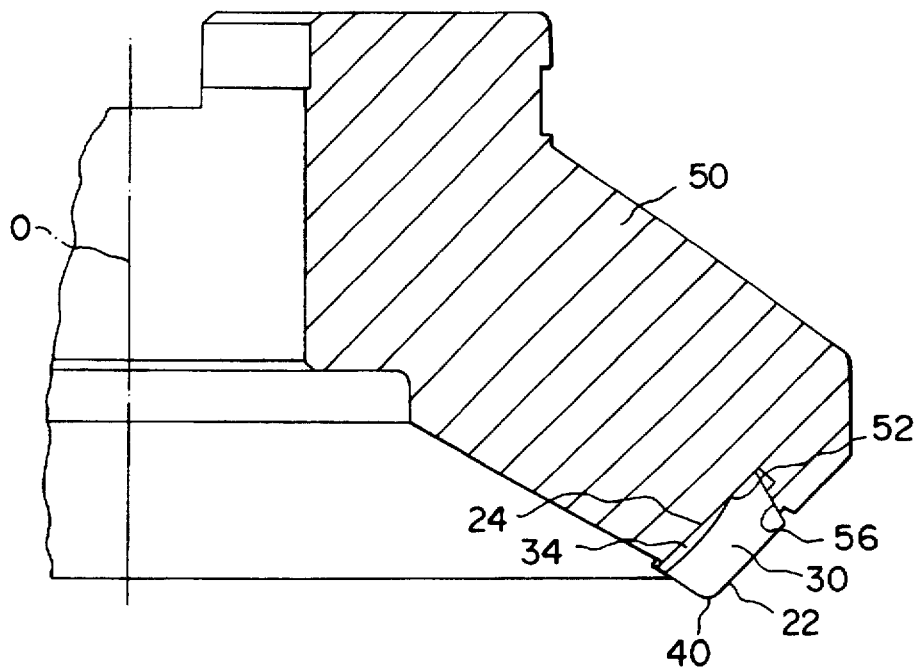
Figure 9:
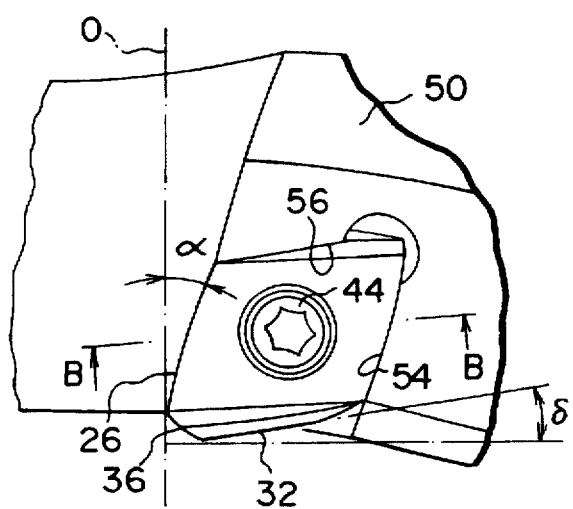
Figure 10:
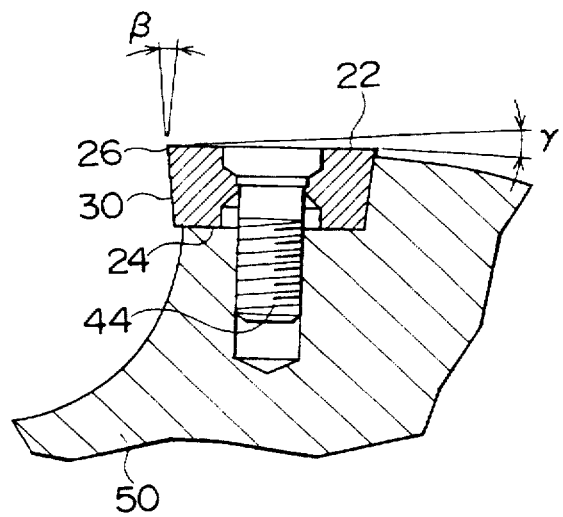
Figure 11:
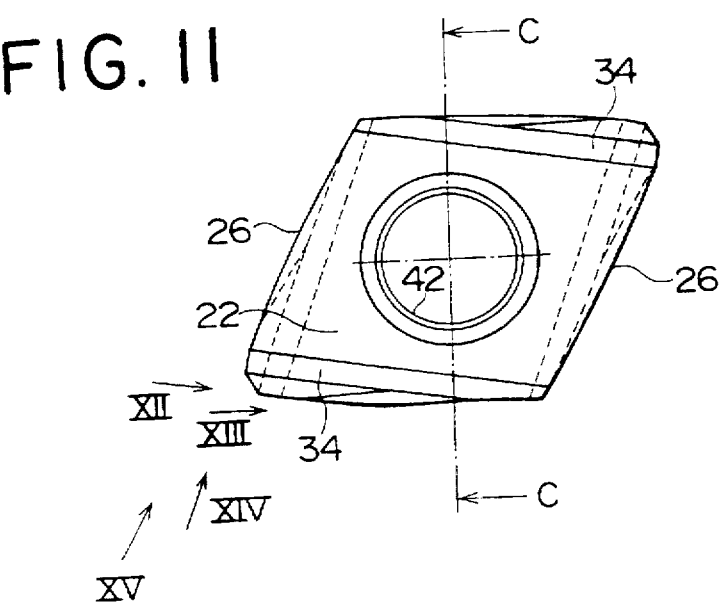
Figure 12:
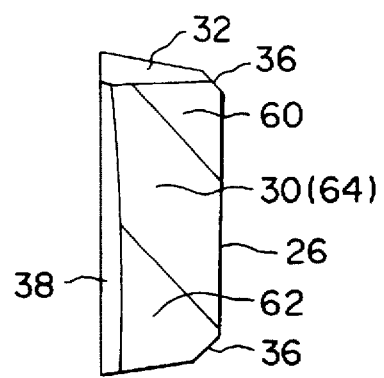
Figure 13:
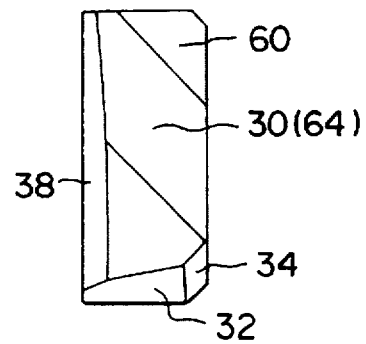
Figure 14:
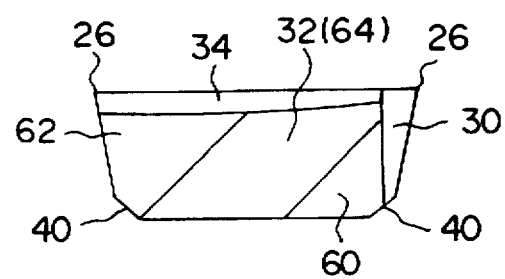
Figure 15:
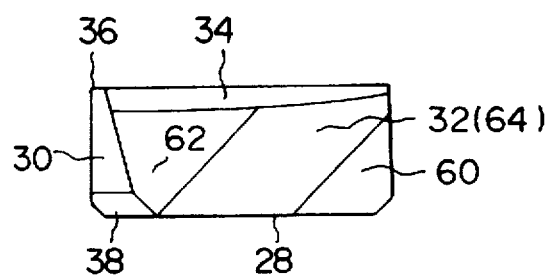
Figure 16:
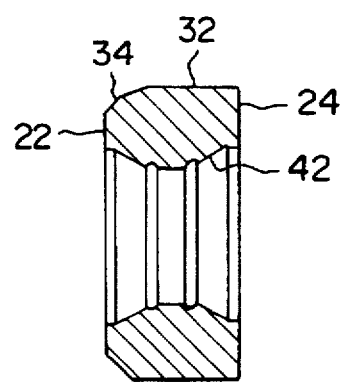

FIG. 4 is a side elevational view of the cutting insert shown in FIG. 1 as viewed in the direction indicated by an arrow IV tangent to the cutting end of the cutting edge in FIG. 1;

FIG. 5 is a side elevational view of the cutting insert shown in FIG. 1 as viewed in the direction indicated by an arrow V tangent to the base end of the cutting edge;

FIG. 6 is a sectional view taken along the line A—A of FIG. 1;

FIG. 7 is an oblique view of the cutting insert as viewed in the direction of a diagonal line interconnecting the acute angle corners of the cutting insert;

FIG. 8 is a vertical sectional view of a part of a rotary cutting mounting plural cutting inserts of the type illustrated in FIG. 1;

FIG. 9 is a partial side view of the tool of FIG. 8 illustrating a critical portion as viewed from a radially outer side of the tool;

FIG. 10 is a partial section of the tool shown in FIG. 9 as viewed along the line B—B of FIG. 9;

FIG. 11 is a plan view of another embodiment of a cutting insert in accordance with the present invention;

FIG. 12 is a side elevational view of the cutting insert of FIG. 11 as viewed in the direction of an arrow XII tangent to the cutting end of the cutting edge;

FIG. 13 is a side elevational view of the cutting insert of FIG. 11 as viewed in the direction of an arrow XIII tangent to the base end of the cutting edge;

FIG. 14 is a side elevational view of the cutting insert of FIG. 11 as viewed in the direction of an arrow XIV tangent to the cutting end of the cutting edge;

FIG. 15 is a side elevational view of the cutting insert of FIG. 11 as viewed in the direction of an arrow XV tangent to the base end of the cutting edge;

FIG. 16 is a sectional view taken along the line C—C of FIG. 11; and

Figure 17:
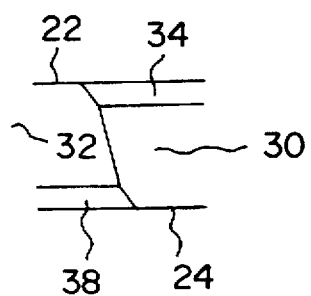

FIG. 17 is a side elevational view of the cutting insert of FIG. 11 as viewed in the direction of the diagonal line interconnecting the acute angle corners.

DETAILED DESCRIPTION OF THE PREFERRED EMBODIMENTS

With reference to the drawings, wherein like reference numerals designate like parts, FIGS. 1 to 7 illustrate one embodiment of the present invention. Numeral 20 generally designates a cutting insert. The cutting insert 20 is made of a hard alloy and basically has a diamond-shaped flat tabular form. The cutting insert thus has an upper surface 22 and a lower surface 24 which oppose each other in the direction of the thickness of the tabular form. Two ridges or edges which are on one breadthwise end of the cutting insert among the four ridges or edges surrounding the upper surface 22 provide main cutting edges 26, 26, while two ridges or edges which are on the other breadthwise end of the cutting insert among the four ridges or edges surrounding the lower surface 24 provide main cutting edges 28, 28. Four flanks around the upper and lower surfaces 22, 24 present faces 30 connected to the main cutting edges 26 and faces 32 connected to the main cutting edges 28.

Each of the faces 30 and 32 connected to the main cutting edges 26, 28 presents an outwardly convex curved surface. The radius of curvature of the curved surface is so set that the positive angle progressively decreases along the length of the cutting insert from the cutting insert end (acute angle corner) remoter from the tool body, i.e., adjacent to the free end of the tool body, (this cutting insert end will be referred to as the "cutting end of the cutting insert") towards the end closer to the tool body, i.e., adjacent to the base end of the tool body, (this cutting insert end will be referred to as the "base end of the cutting insert") and is finally reduced to zero at the cutting insert base end. Practically, the positive angle is set to range between 10° to 20° (nose angle 70° to 80° ) at the cutting insert cutting end and is gradually reduced such that the positive angle is zero (nose angle 90° ) at the base end of the cutting insert.

The ridges or edges of the upper surface which do not provide the main cutting edges 26 are chamfered by a predetermined amount so as to provide sub-relief surfaces 34 which intersect the upper surface 22 to an obtuse angle and which, at their end adjacent to the acute angle corners, form a sub-cutting edge 36 between each sub-relief surface 34 and the associated face 30.

Similarly, the ridges or edges of the lower surface which do not provide the main cutting edges 28 provide sub-relief surfaces 38 similar to the sub-relief surfaces 34. Thus, the sub-relief surfaces intersect the lower surface 24 at an obtuse angle and sub-cutting edges 40 are formed at the edges where the sub-relief surfaces 34 intersect the associated faces 32.

Numeral 42 designates a bolt hole through which a bolt 44 is driven into a threaded hole in a tool body so as to secure the cutting insert 20 to the tool body.

A description will now be given of the construction of the tool body to which the cutting insert 20 is secured, with reference to FIGS. 8 and 9.

The tool body, denoted by 50, has a generally cylindrical form and is rotatable about an axis 0. A plurality of cutting inserts 20 are mounted on the outer peripheral portions of the lower end of the tool body 50 at a predetermined circumferential pitch. Each cutting insert 20 is supported by a reference surface 52 and restraint surfaces 54, 56 which are formed on the tool body 50. The reference surface 52 is directed radially outwardly. The restraint surface 54 intersects the reference surface 52 and is directed to the leading side as viewed in the direction of the tool rotation. The restraint surface 56 is directed towards the end of the tool.

Each cutting insert 20 is fixed to the tool body 50 by tightening the bolt 44 in such a manner that one of the upper and lower surfaces 22, 24 is held in close contact with the reference surface 52 and such that the two flanks (faces 30 and 32 which are not in use) on both sides of an acute angle corner are restrained by the restraint surfaces 54, 56. It will be seen that one of the pair of main cutting edges 26, 26 and one of the pair of main cutting edges 28, 28 are put to use, depending on which one of the upper and lower surfaces 22, 24 contacts the reference surfaces 52 and which one of the acute angle corners is directed outward.

It is assumed here that the cutting insert 20 is so mounted that the lower surface 24 is held in contact with the reference surface 52. In this case, a predetermined outer circumferential relief angle γ is given to the upper surface 22 which in this state is directed radially outward. At the same time, axial rake angle a and radial rake angle β are given to the face 30 which is directed to the leading side as viewed in the direction of tool rotation. A predetermined relief angle δ is given to the face 32 which is directed towards the axial outer end of the tool.

The face 30 has a continuous convex curved surface so that the above-mentioned axial rake angle α progressively increases from the cutting end towards the base end of the cutting insert. As to the radial rake angle β, this rake angle is determined by the angle at which the upper surface 22 intersects the face 30, provided that the relief angle γ of the upper surface is constant. The above-mentioned angle of intersection is small at the cutting end and progressively increases to 90° towards the base end of the cutting insert. The rake angle β therefore progressively decreases from the cutting end towards the base end of the cutting insert.

In the cutting tool incorporating the cutting inserts of the described construction, a large nose angle is preserved to enhance the strength at the base end portion of the cutting edge which is obliged to perform cutting at the cutting boundary, thus enabling cutting to be performed at a greater feeding rate.

At the same time, in the case of a small cutting penetration, a large rake angle is preserved at the end portion of the cutting insert, thus reducing the cutting resistance. Furthermore, the whole face area presents a convex curved surface so that the area of contact between the face and the cut metal chip is reduced to ensure a smooth discharge of the cut meal chips. Since the convex curved surface is continuous, there is not a discontinuity or a drastic change in the shape of the face nor in the cutting edge. Thus, the rake angle and the nose angle smoothly or progressively increase and decrease. Consequently, any risk of extraordinary local wear of the cutting insert is avoided.

In the described embodiment, the rake angle β progressively decreases along the cutting insert from the free end towards the base end of the tool body. Obviously, however, the arrangement may be such that the angle β progressively increases along the cutting insert in the direction from the free end towards the base end of the tool body.

FIGS. 11 to 17 illustrate another embodiment of the present invention. In the cutting insert 20A of this application, each of the faces 30 and 32 has flat surface portions 60 and 62 formed thereon at locations adjacent to the base end and adjacent to the cutting end of the cutting insert, respectively, and the convex curved surface portion 64 is formed between these two flat surface portions 60 and 62.

In this embodiment, the angle at which the flat surface portion 60 adjacent to the cutting end of the cutting insert intersects the upper or lower surface 22 or 24 of the cutting insert is determined to be smaller than the angle of intersection between the flat surface portion 62 adjacent to the cutting insert base end and the upper or lower surface 22 or 24 of the cutting insert. Thus, in this embodiment also, the nose angle progressively increases, while the rake angle progressively decreases, along the cutting insert in the direction from the free end towards the base end of the tool.

According to this arrangement, although a discontinuity of the face is present between each of the flat surface portions 60 and 62 and the convex curved surface 64, constant rake angles are obtained within the regions where the flat surface portions 60 and 62 intersect the upper surface 22 or the lower surface 24. It is therefore possible to obtain constant cutting performance in terms of cutting effect, metal chip discharging performance and/or cutting edge strength, over a predetermined range of the cutting edge adjacent to the free end of the tool and over a predetermined range of the cutting edge adjacent to the base end of the tool. In addition, each of the faces 30 and 32 of this embodiment have a smoother surface as compared with conventional cutting inserts in which the face is composed of flat surface portions directly connected to each other, because both flat surface portions 60, 62 are connected through the intermediary of the convex curved surface 64. It is therefore possible to prevent extraordinary wear without impairing cut metal chip discharging performance.

Obviously, this embodiment also may be modified such that the rake angle progressively increases from the end adjacent to the end of the tool towards the end adjacent the base end of the tool.

As will be clear from the foregoing description, according to the present invention, each of the flanks or side surfaces of a cutting insert of a substantially diamond-like planar shape is at least partially curved to convex outward so that the angle at which each flank or side surface intersects with the upper or lower surfaces of the cutting insert progressively changes along the cutting insert in the direction from the free end of the tool towards the base end of the tool. Therefore, at least a part of the face is constituted by a continuous surface, so that the area of contact between the cut metal chips and the face is reduced to ensure smooth and efficient discharge of the cut metal chips. In addition, since the angle at which each face intersects the upper or lower surface of the cutting insert changes progressively along the length of the cutting insert, it is possible to design the cutting insert such that a large rake angle is preserved to provide a large cutting effect at a certain portion of the cutting edge, whereas, at another portion of the cutting edge, the nose angle is increased to provide greater strength of the cutting edge.

What is claimed is:

1. A cutting insert for a face mill tool comprising:
   a body for attachment to said tool having oppositely spaced upper and lower surfaces containing sides arranged in alternating acute and obtuse angular disposition defining a substantial diamond shape;
   flank portions extending between and connecting said upper and lower surfaces to define main cutting edges extending along oppositely spaced sides from a cutting end defined by a pair of acute angularly related sides adapted to be disposed remote from said tool and a base end defined by a pair of obtusely related sides adapted to be received by said tool;
   said flank portions defining each main cutting edge containing a convexly curved surface that intersects with the cooperating upper or lower surface which defines said cutting edge at an angle that progressively changes along said main cutting edge between said cutting end and said base end thereof.

2. A cutting insert according to claim 1 in which said angle of intersection between said convexly curved surface of said flank portion and said upper or lower surface defining said main cutting edge progressively decreases along said main cutting edge between said cutting end and said base end thereof.

3. A cutting insert according to claim 2 in which said angle of intersection between said convexly curved surface of said flank portion and said upper or lower surface defining said main cutting edge is substantially 0° at said base end of said main cutting edge.

4. A cutting insert according to claim 1 in which said flank portion forming said main cutting edge has flat surfaces disposed on opposite sides of said convexly curved surface adjacent said cutting end and said base end of said main cutting edge, respectively, said flat surfaces intersecting said cooperating one of said upper and lower surfaces at a constant angle.

5. A cutting insert according to claim 1, wherein the angle of intersection between the convex curved surface and said one of the upper and lower surfaces progressively increases along the length of said intersection from a face adjacent to a base end of the tool.

6. A cutting insert according to claim 1 wherein the angle of intersection between the convex curved surface and said one of the upper and lower surfaces progressively decreases along the length of said intersection from a face end adjacent to a base end of the tool.

* * * * *